United States Patent [19]

Osawa

[11] Patent Number: 4,488,787
[45] Date of Patent: Dec. 18, 1984

[54] PHOTOGRAPHIC LENS WITH VARIABLE RANGE FOCUS ADJUSTMENT BETWEEN SELECTED END LIMITS

[75] Inventor: Masami Osawa, Saitama, Japan

[73] Assignee: Kino Precision Industries, Ltd., Tokyo, Japan

[21] Appl. No.: 440,613

[22] Filed: Nov. 10, 1982

[30] Foreign Application Priority Data

Apr. 19, 1982 [JP] Japan .................. 57-57294[U]

[51] Int. Cl.³ .............................................. G02B 7/04
[52] U.S. Cl. ......................... 350/429; 350/255; 350/430
[58] Field of Search .................. 350/429, 430, 255

[56] References Cited

U.S. PATENT DOCUMENTS 4,139,268  2/1979  Litman ........................ 350/255
4,166,675  9/1979  Kanno ........................ 350/255

Primary Examiner—John K. Corbin
Assistant Examiner—P. M. Dzierzynski
Attorney, Agent, or Firm—Fulwider, Patton, Rieber, Lee & Utecht

[57] ABSTRACT

A photographic lens including a focus ring rotatable about a lens housing between prescribed end limits to displace a focusing lens element between positions corresponding respectively with relatively long and relatively short focus settings, wherein a range stop assembly is provided for selectively adjusting the end limits at focus settings corresponding with positions at which scenes or events are anticipated by the photographer. In a preferred form, the range stop assembly comprises a pair of axially slidable adjustment sleeves normally biased into locked positions for rotation with the focus ring and respectively supporting control pins extending into cam grooves on a fixed portion of the lens housing to define the end limits of focus ring rotation. Each adjustment sleeve is movable manually from the locked position to permit rotation relative to the focus ring thereby altering the relative position of the associated control pin within its cam groove to adjust the corresponding end limit of focus ring rotation.

26 Claims, 5 Drawing Figures

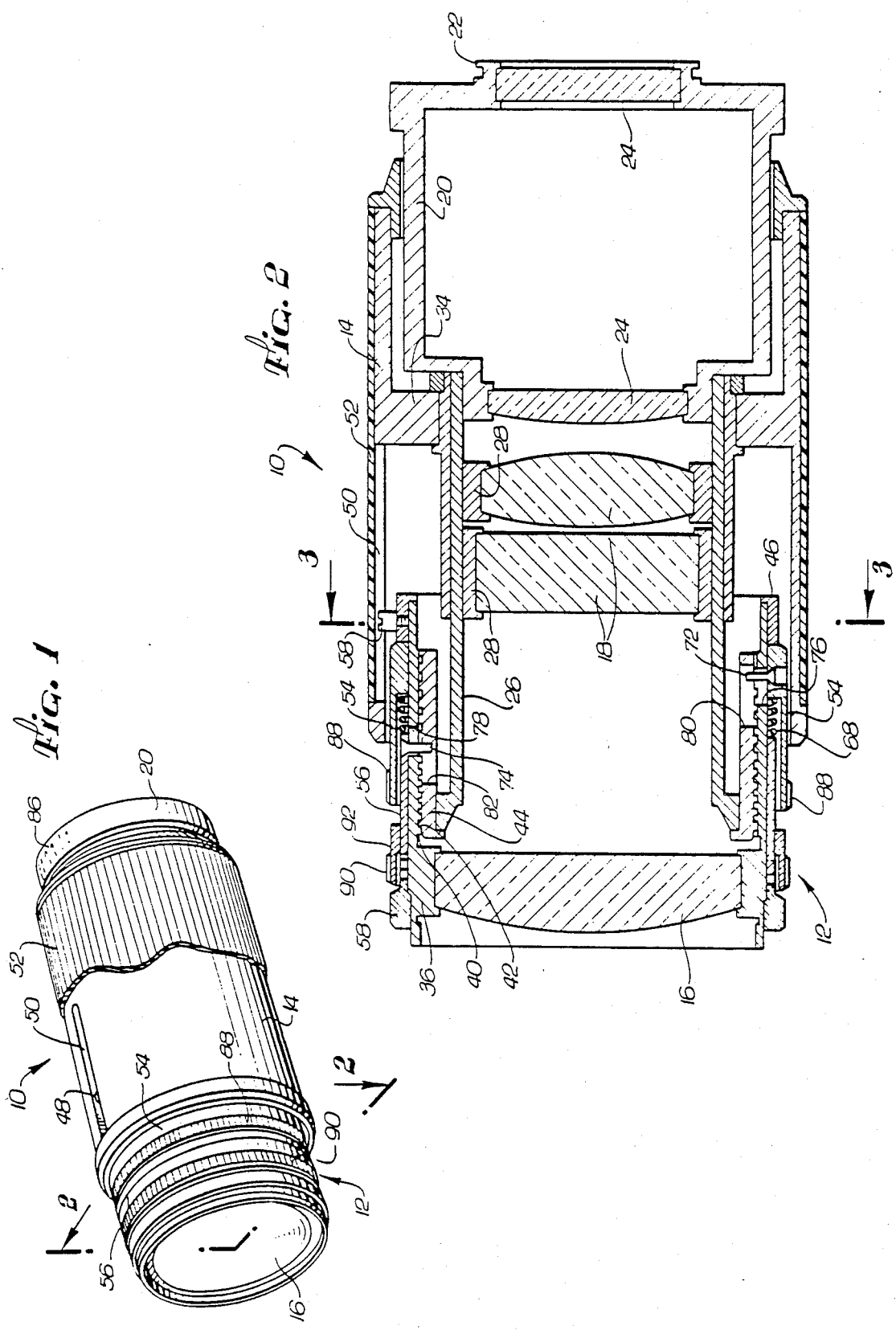

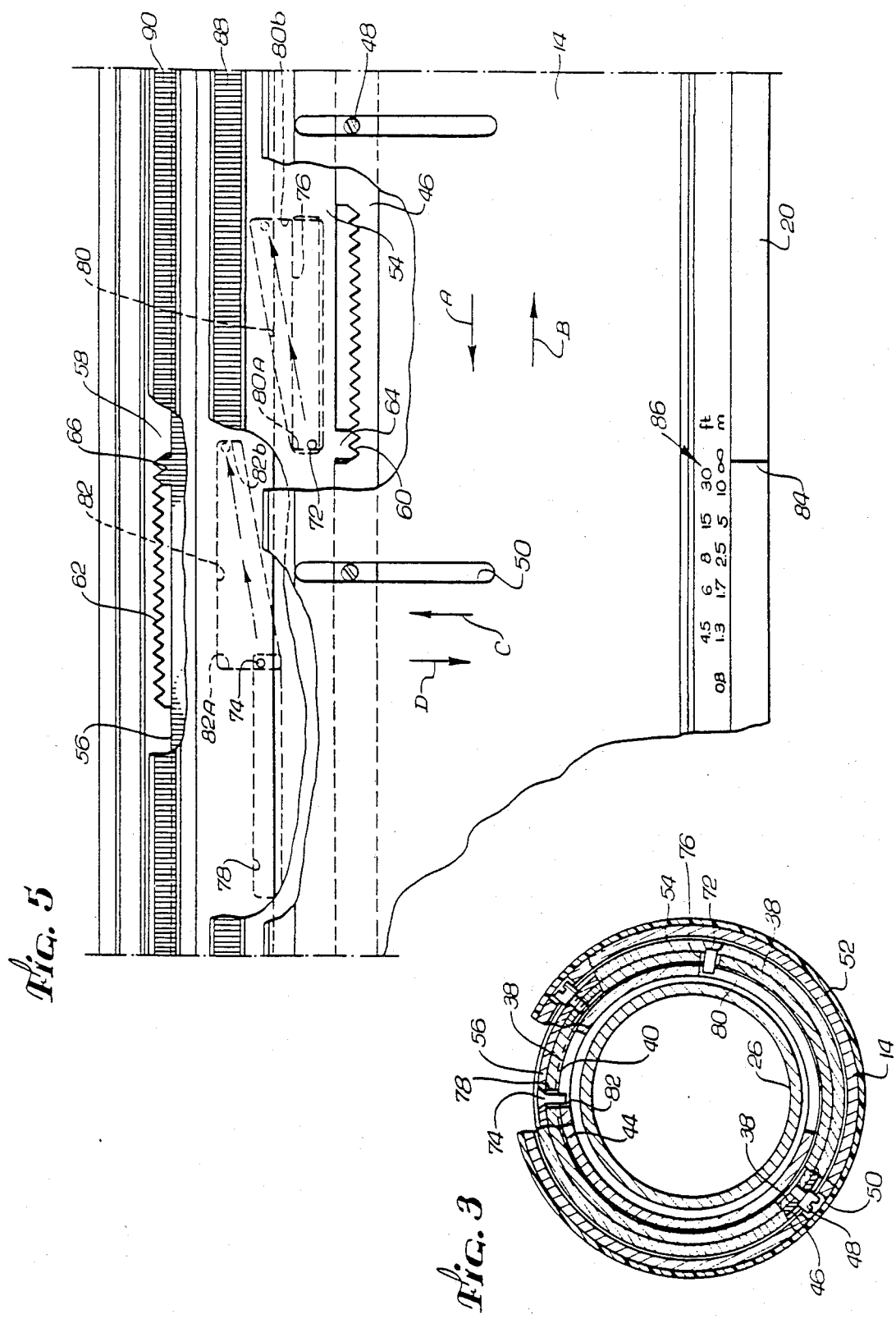

PHOTOGRAPHIC LENS WITH VARIABLE RANGE FOCUS ADJUSTMENT BETWEEN SELECTED END LIMITS

BACKGROUND OF THE INVENTION

This invention relates generally to improvements in photographic lenses of the variable focus type. More particularly, this invention relates to a novel photographic lens including means for selecting both end limits of the focus adjustment range to correspond with focus settings desired by the photographer.

Variable focus photographic lenses in general are well known to include one or more lens elements supported within a lens housing for appropriate movement to focus an image with respect to a camera or the like. A focus ring is carried for rotation about the lens housing and is mechanically coupled to one or more of the lens elements for axially displacing the lens elements to adjust the focus setting of the photographic lens. Focus adjustment is normally permitted within a prescribed range typically between an infinite focus setting and a relatively close focus setting, with a control pin on the focus ring being movable between fixed stops on the lens housing to limit rotational movement of the focus ring.

During normal use of the photographic lens, the photographer rotates the focus ring to the appropriate focus setting prior to taking a picture. The proper focus setting, however, must be checked visually, particularly at positions intermediate the infinite and minimum settings either by looking through a viewfinder to determine the image clarity or by inspecting distance index markings normally provided on the lens housing. Unfortunately, the time required to visually check the focus setting may result in the photographer missing rapidly occurring scenes or events.

In some instances, the photographer can anticipate the occurrence of scenes or events at different distances from the camera but lacks the physical ability to adjust the focus setting with sufficient speed to photograph these scenes or events. For example, sports events are typified by action which may occur in rapid sequence and at different distances from the photographer, wherein at least some of these distances can be anticipated in advance. However, in a conventional photographic lens, it has not been possible to focus rapidly from one scene to another, since the time-consuming visual focus check is still required before the picture can be taken.

In one proposed photographic lens construction, apparatus is provided for adjusting one end limit of focus ring rotation, thereby advantageously providing a mechanical stop corresponding with one selected focus setting at which action is anticipated by the photographer. See, for example, commonly assigned and copending U.S. application Ser. No. 440,614, filed Nov. 10, 1982, and entitled PHOTOGRAPHIC LENS WITH VARIABLE RANGE FOCUS ADJUSTMENT. In many instances, however, it is desirable to adjust both ends limits of focus ring rotation to provide two selectively set mechanical stops corresponding with two focus settings at which action is anticipated, in which case the above-cited proposed lens construction is of limited utility.

There exists, therefore, a significant need for an improved photographic lens wherein both end limits to rotation of a focus ring can be quickly and easily adjusted to provide mechanical stops corresponding with two selected focus settings, thereby permitting rapid focus adjustment from any intermediate position to one of the selected settings without requiring a visual focus check before a picture can be taken. The present invention fulfills this need and provides other related advantages.

SUMMARY OF THE INVENTION

In accordance with the invention, a photographic lens of the variable focus type is provided with an adjustable range stop assembly for selectively altering the end limits of focus adjustment. The range stop assembly is adjustable to provide preselected end limits to rotation of a focus ring at two selected focus settings corresponding with distance positions at which scenes or events are anticipated by the photographer. The range stop assembly thus provides mechanical stops to prevent further focus ring rotation when a selected end limit is reached thereby permitting rapid focus adjustment to the selected setting without requiring any visual focus check prior to taking a photograph.

The variable focus photographic lens conventionally includes one or more focusing lens elements supported within a lens housing for movement to alter the lens focus setting in response to rotation of a focus ring carried about the lens housing. Rotation of the focus ring is normally limited to a prescribed range to permit movement of the focusing lens elements between an infinity focus setting position and a minimum focus setting position typically on the order of about one to three feet.

In accordance with a preferred form of the invention, the range stop assembly includes a pair of axially slidable adjustment sleeves each biased by a spring into a normally locked position for rotation with the focus ring when the focus setting is adjusted. These adjustment sleeves respectively support a pair of control pins which project into cam grooves on a fixed portion of the lens housing wherein the control pins provide mechanical stops engageable with the ends of the cam grooves to define the end limits of focus ring rotation. However, the adjustment sleeves are individually movable against the spring to an unlocked position whereat the sleeves are rotatable relative to the focus ring to alter the position of their respective control pins within the associated cam grooves and thereby selectively alter the end limits of focus ring rotation.

In a particular embodiment of the invention, the adjustment sleeves are slidably carried about a cylindrical mounting tube which supports the focusing lens element and which is rotated by the focus ring to displace the focusing lens element to adjust focus setting. This mounting tube carries a pair of locking rings defining axially opposed sets of locking teeth respectively engageable by protrusions formed on the adjustment sleeves, and the spring reacts between the adjustment sleeves to hold the protrusions normally in locking engagement with the respective sets of teeth. Each adjustment sleeve is individually movable against the spring to retract the respective protrusion from engagement with the associated set of teeth thereby unlocking the sleeve and permitting rotation thereof relative to the focus ring. When a new end limit is set, the spring returns the sleeve to a locked condition with respect to the associated set of teeth.

Other features and advantages of the present invention will become more apparent from the following detailed description and accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating a photographic lens including an adjustable range stop assembly embodying the novel features of the invention;

FIG. 2 is a longitudinal vertical section taken generally on the line 2—2 of FIG. 1;

FIG. 3 is an enlarged fragmented vertical section taken generally on the line 3—3 of FIG. 2;

FIG. 5 is an enlarged somewhat schematic developed plan view illustrating operation of the range stop assembly to adjust lens focal range between selected end limits.

DETAILED DESCRIPTION OF THE PREFERRED EMBODIMENT

Figure 4:
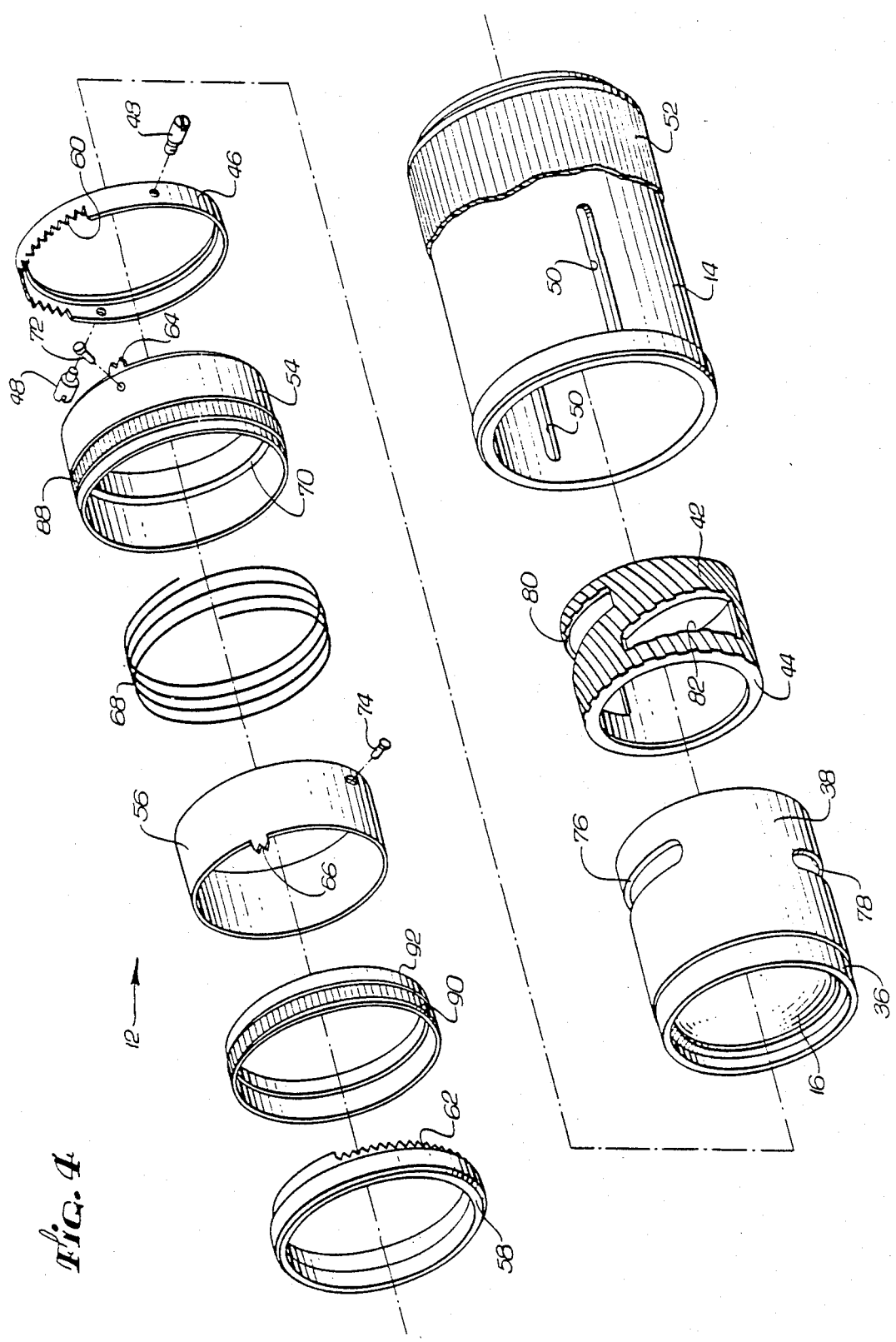
FIG. 4 is an exploded perspective view illustrating construction details of the invention.

As shown in the exemplary drawings, a photographic lens referred to generally by the reference numeral 10 includes a range stop assembly 12 for selectively adjusting the permitted end limits of rotational movement of a focus ring 14 which is coupled to one or more focusing lens elements 16 to adjust the focus setting of the lens. More particularly, the range stop assembly 12 is adjustable to select one end limit of focus ring rotation at a selected relatively long focus setting and to select the opposite end limit at a selected relatively short focus setting thereby permitting rapid and accurate focus adjustment to either one of the selected focus settings.

The photographic lens 10 including the range stop assembly 12 constitutes a substantial improvement over conventional photographic lenses wherein a focus ring is rotatable between fixed end limits corresponding with an infinite focus setting position and a minimum focus setting position, typically on the order of about one to three feet. With such conventional lenses, when it is desired to photograph an object located at an intermediate distance, it is necessary to rotate the focus ring to the appropriate intermediate rotational position while visually checking the focus setting either by observing the image clarity through a viewfinder or by reference to index markings on the lens housing. Visual checking of the focus setting, however, is a relatively time-consuming procedure which may cause the photographer to miss events or scenes occuring rapidly, in spite of the fact that the photographer might be able to anticipate the position at which the scene or event will occur. In the present invention, the range stop assembly permits adjustable selection of both end limits of focus ring rotation to a pair of predetermined different positions corresponding with a pair of focus settings at which action is anticipated by the photographer. The photographer can, therefore, photograph other scenes or events at intermediate focal distances in a normal manner yet rapidly rotate the focus ring to either one of the preselected end limits to photograph action occurring at that focus setting without visually checking the focus setting.

One preferred form of the photographic lens 10, including the range stop assembly 12 of this invention, is illustrated by way of example in FIGS. 1-5. As shown, the exemplary photographic lens 10 comprises a so-called zoom lens wherein the focus ring 14 is carried about a generally cylindrical lens housing which provides a support structure for the focusing lens element 16 at the front of the lens housing and one or more so-called zoom lens elements 18 positioned behind the focusing lens element. As is conventional with a zoom lens, the focus ring 14 is rotatable about the lens housing to axially displace the focusing lens element 16 thereby adjusting lens focus setting. In addition, the focus ring 14 is axially slidable about the lens housing to displace the zoom lens elements 18 in the axial direction to alter image magnification.

More particularly, as shown best in FIG. 2, the lens housing includes a generally cylindrical fixed housing portion 20 which provides a support structure for the remaining components of the photographic lens 10 and further includes an adapter ring 22 of appropriate size and shape for connection to a camera (not shown). If desired, the fixed housing portion 20 may also support one or more stationary optical lens elements 24, depending upon the particular optical characteristics of the zoom lens. A stationary support sleeve 26 is secured to the axially forward end of the fixed housing portion 20 and projects forwardly therefrom to a position near the front of the lens.

The stationary support sleeve 26 provides a slide track for axial sliding movement of the zoom lens elements 18 in response to axial motion of the focus ring 14. More specifically, the support sleeve 26 slidably carries a pair of lens mounting rings 28 which in turn support the zoom lens elements 18, wherein these mounting rings 28 are coupled through the support sleeve to a relatively short carrier sleeve 30 wrapped about the support sleeve for axial sliding motion with respect thereto. The particular nature of this coupling between the mounting rings 28 and the carrier sleeve 30 can take any one of a variety of forms commonly used in zoom lenses, such as guide pins (not shown) extending through axial or spiraling slots (also not shown) in the support sleeve, whereby this coupling is not shown or described in detail herein.

The carrier sleeve 30 is shaped to include an outer circumferential recess 32 for seated reception of a flange 34 projecting radially inwardly from the focus ring 14, wherein the flange 34 transmits axial sliding motion of the focus ring directly to the carrier sleeve 30 which in turn axially displaces the zoom lens elements 18 to adjust image magnification, all in a well-known manner. However, the flange 34 is rotatable within the recess 32 without effecting axial displacement of the zoom lens elements 18, whereby this rotational freedom can be used to axially displace the focusing lens element 16 to adjust the lens focus setting independent of image magnification.

The focusing lens element 16 is supported at the front of the photographic lens 10 by an annular ring 36 at the front of a cylindrical lens mounting tube 38 having a helicoid track 40 of relatively large lead angle formed on its inner diameter surface. This mounting tube 38 is sized for engagement of its helicoid track 40 with a matingly shaped track 42 on the outer diameter surface of a cam tube 44. As shown best in FIG. 2, the cam tube 44 is in turn carried about and rigidly secured to the forwardmost end of the stationary support sleeve 26. With this construction, rotational movement of the lens mounting tube 38 with respect to the cam tube 44 displaces the focusing lens element 16 axially to adjust the focus setting of the photographic lens.

Rotational movement is imparted to the lens mounting tube 38 by the focus ring 14 in response to focus ring rotation. More particularly, an annular locking ring 46 is secured about the rearmost end of the mounting tube 38 and supports a pair of diametrically opposed guide pins 48 upstanding into axially extending slots 50 in the focus ring 14. Accordingly, rotational movement of the focus ring 14 is transferred via the guide pins 48 to the locking ring 46 and the mounting tube 38 to rotate the mounting tube 38 about the cam sleeve 44. The axial slots 50, however, permit axial sliding of the focus ring without displacing the mounting tube 38, thereby permitting independent adjustment of image magnification and focus setting. Conveniently, the slots 50 are hidden from view by a hand grip 52 wrapped about the focus ring and having a rough surface texture to facilitate manual operation of the focus ring.

The range stop assembly 12 provides a pair of adjustably positioned mechanical stops for limiting the magnitude of rotation of the focus ring 14 about the lens housing to correspondingly limit the range of focus settings through which the focusing lens element 16 can be adjusted. In particular, the range stop assembly 12 provides adjustable end limits to focus ring rotation to restrict focus setting adjustment to a range between an infinite focus setting and a relatively short focus setting typically about one to three feet, or to some selected narrower range of adjustment depending upon the operational setting of the range stop assembly.

The range stop assembly 12 comprises, as shown in detail in FIGS. 2-4, a pair of adjustment sleeves 54 and 56 carried about the lens mounting tube 38 for axial sliding movement between the locking ring 46 at the rear end of the mounting tube 38 and a second locking ring 58 secured about the front end of the mounting tube 38. These two locking rings 46 and 58 are shaped to include axially facing sets 60 and 62 of circumferentially spaced locking teeth for releasable locking engagement with axially opposed protrusions 64 and 66 formed respectively on the adjustment sleeves 54 and 56, wherein these protrusions conveniently may be indented as shown for locking engagement with several of the locking teeth. A helical compression spring 68 reacts between the rear end of the forward adjustment sleeve 56 and a forwardly presented annular shoulder 70 on the rear adjustment sleeve 54 to urge the sleeves 54 and 56 normally axially away from each other thereby moving their respective protrusions 64 and 66 into locking engagement with the adjacent sets of teeth 60 and 62. With this construction, both adjustment sleeves 54 and 56 are normally rotatable with the focus ring 14 and the lens mounting tube 38 whenever the focus setting is adjusted.

Rotational movement of the adjustment sleeves 54 and 56, and thus also the rotational movement of the focus ring 14, is limited by a pair of control pins 72 and 74 respectively secured to the adjustment sleeves 54 and 56 to project through associated clearance slots 76 and 78 in the lens mounting tube 38 and further into respective cam grooves 80 and 82 in the nonrotational cam sleeve 44. These cam grooves 80 and 82 respectively include circumferentially opposed end limits 80A, 80B, and 82A, 82B which are engageable by the control pins 72 and 74 to stop focus ring rotation. As illustrated, these cam grooves 80 and 82 can be appropriately widened in the axial direction to accommodate movement of the control pins in the fore-aft direction through a normal range of focus setting adjustment.

As shown best in developed schematic form in FIG. 5, the control pins 72 and 74 respectively constitute adjustable mechanical stops limiting rotational movement of the focus ring. More particularly, when the focus ring is in an infinity focus setting, as indicated by alignment between an index mark 84 on the fixed housing portion 20 and a numerical scale 86 on the focus ring, the control pins 72 and 74 are carried respectively into abutting engagement with the ends 80A and 82A of the cam grooves 80 and 82 to prevent further rotation of the focus ring in the direction of arrow "A". The focus ring can be rotated in an opposite direction, however, as indicated by the arrow "B", until the control pins 72 and 74 respectively engage the ends 80B and 82B of the cam grooves, as shown in dotted form in FIG. 5, at which time further rotation in that direction is prevented and the index mark 84 indicated a minimum focus setting position.

The rotational position of the control pins 72 and 74 within the respective cam grooves 80 and 82 is quickly and easily adjustable without rotating the focus ring to selectively adjust the end limits of focus ring rotation. That is, with further reference to FIG. 5, the rear adjustment sleeve 54 can be manually pulled against the spring 68 in a forward direction as indicated by arrow "C" to retract the protrusion 64 from the set of teeth 60 on the locking ring 46 thereby permitting rotation of the adjustment sleeve relative to the focus ring in the direction of arrow "B" and repositioning of the protrusion 64 relative to the set of teeth 60. Such repositioning correspondingly moves the control pin 72 in the direction of arrow "B" toward the opposite end 80B of the cam groove 80. When the adjustment sleeve 54 is released, the spring 68 reengages the protrusion 64 with the set of teeth 60, and rotation of the focusing ring 14 in the direction of arrow "B" toward shorter focus settings will carry the control pin 72 into abutting engagement with the cam groove end 80B before the minimum focus setting is reached. The particular point at which the control pin 72 stops focus ring rotation is controlled by the relative position of the protrusion 64 with respect to the teeth 60.

Similarily, whenever the focus ring 14 is in a relatively short focus setting position, the control pin 74 can be repositioned within the cam groove 82 by pulling rearwardly in the direction of arrow "D" on the forward adjustment sleeve 56 to retract the protrusion 66 from the associated set of locking teeth 62. The adjustment sleeve 56 is thus unlocked and permitted to rotate in the direction of arrow "A" to repositon the protrusion 66 relative to the teeth 62, whereupon the spring 68 will return the adjustment sleeve 56 to a locked position as soon as the sleeve 56 is released. This moves the control pin 74 relatively closer to the end 82A of the cam groove 82 whereupon subsequent focus ring rotation will be stopped by the control pin 74 before the infinity focus setting is reached. Once again, the particular focus setting at which focus ring rotation is stopped by the control pin is related to the position of the protrusion 66 along the teeth 62.

The two adjustment sleeves 54 and 56 are easily grasped by the photographer to facilitate rapid and accurate adjustment of the control pins 72 and 74 to the selected focus settings. In this regard, the adjustment sleeve 54 is conveniently provided with an external ridge 88 of roughened surface texture disposed slightly to the front of the focus ring, as viewed in FIGS. 1 and 2, where it can be easily grasped and pulled forwardly to unlock the adjustment sleeve 54 from the locking ring 46. A similar external ridge 90 of roughened surface texture is formed about an exposed ring 92 secured to the front adjustment sleeve 56 where it can be easily grasped and pulled rearwardly to unlock the sleeve 56 from the locking ring 58.

The range stop assembly 12 thus permits rapid and easy selection of the particular focus settings at which focus ring rotation is stopped, wherein these focus settings can be selected to correspond with focal distances at which scenes or events are anticipated by the photographer. The photographic lens 10 can be used in a normal manner to photograph objects at either end limit or at any intermediate setting, while permitting rapid and accurate readjustment of the focus setting to either selected end limit whenever desired.

A variety of modifications and improvements to the photographic lens described herein are believed to be apparent to one skilled in the art. Accordingly, no limitation on the invention is intended, except by way of the appended claims.

What is claimed is:

1. A photographic lens with variable range focus setting adjustment, comprising:
   a generally cylindrical lens housing supporting at least one focusing lens element for axial displacement therein to adjust the focus setting of the photographic lens;
   a focus ring rotatable about said lens housing and operably coupled to displace said focusing lens element through a range of focus settings in response to focus ring rotation; and
   a range stop assembly for limiting focus ring rotation to a prescribed range of movement relative to said lens housing to correspondingly limit the permitted range of focus setting adjustment, said range stop assembly including a pair of circumferentially spaced end limits formed cooperatively between said lens housing and said focus ring, said end limits respectively defining the opposite ends of the prescribed range of focus ring rotational movement and including means for preventing focus ring rotation beyond said prescribed range, said range stop assembly further including means accessible from the exterior of said focus ring for selectively and individually altering the positions of said end limits to correspond with a selected pair of focus settings thereby altering the circumferential spacing between said end limits and selecting the permitted range of focus setting adjustment between two selected focus settings.

2. The photographic lens of claim 1 wherein:
   said lens housing includes a housing portion fixed against rotation and having at least one cam groove extending partially about the circumference thereof;
   said range stop assembly comprising a pair of adjustment sleeves carried by said lens housing for rotational movement with respect thereto and supporting respectively a pair of control pins extending into said cam groove, and means for locking said adjustment sleeves for rotation with said focus ring for engagement of said control pins with the ends of said cam groove upon focus ring rotation to define the end limits of focus ring rotation, said locking means being releasable to permit selective individual rotation of said adjustment sleeves relative to said focus ring to selectively alter the respective positions of said control pins relative to said cam groove to correspondingly alter the position of the end limits.

3. The photographic lens of claim 2 wherein said adjustment sleeves are carried by said lens housing for axial sliding and rotational movement relative thereto, said locking means including axially presented locking surfaces formed on said adjustment sleeves and a housing portion rotatable with said focus ring, and spring means for urging said adjustment sleeves axially for normal locking engagement of said locking surfaces, said adjustment sleeves being axially retractable individually against said spring means to disengage said locking surfaces.

4. The photographic lens of claim 3 wherein said adjustment sleeves are axially spaced from each other, said spring means comprising a compression spring reacting between said adjustment sleeves for urging said adjustment sleeves axially away from each other.

5. The photographic lens of claim 3 wherein said locking surfaces comprise a pair of axially presented sets of locking teeth arranged to extend at least partially about the circumference of said rotatable housing portion and a pair of axially extending protrusions formed respectively on said adjustment sleeves for respective engagement with said sets of teeth.

6. The photographic lens of claim 2 wherein said at least one cam groove comprises a pair of cam grooves for respective reception of said pair of control pins.

7. The photographic lens of claim 2 wherein said pair of adjustment sleeves are at least partially exposed at one end of said focus ring to permit grasping of said adjustment sleeves.

8. The photographic lens of claim 3 wherein said rotatable housing portion is carried about said fixed housing portion, said control pins on said adjustment sleeves extending generally inwardly through clearance slots formed in said rotatable housing portion and into said cam groove, said clearance slots having sufficient axial width to permit sufficient axial movement of said adjustment sleeves for engaging and disengaging said locking surfaces.

9. The photographic lens of claim 1 wherein said lens housing further supports at least one zoom lens element for axial displacement to adjust image magnification, said focus ring being axially slidable about said lens housing and operably coupled to displace said at least one zoom lens element through a range of image magnification settings in response to axial movement of said focus ring.

10. A photographic lens with variable range focus setting adjustment, comprising:
    a generally cylindrical lens housing supporting at least one focusing lens element for axial displacement therein to adjust the focus setting of the photographic lens, said lens housing including a housing portion fixed against rotation and having a pair of cam grooves formed therein each to extend at least partially about the circumference of said lens housing;
    a focus ring rotatable about said lens housing and operably coupled to displace said focusing lens element through a range of focus settings in response to focus ring rotation; and
    a range stop assembly for adjustably selecting the permitted range of focus ring rotation to correspondingly select the permitted range of focus ring adjustment, said range stop assembly including a pair of adjustment sleeves carried by said lens housing for rotational movement with respect thereto and supporting respectively a pair of control pins extending respectively into said cam grooves, and means for locking said adjustment sleeves for rotation with said focus ring for engagement of said control pins with the ends of said cam grooves upon focus ring rotation to define the end limits of focus ring rotation, said locking means being releasable to permit selective individual rotation of said adjustment sleeves relative to said focus ring to selectively alter the respective positions of said control pins relative to said cam grooves to correspondingly alter the positions of the end limits.

11. The photographic lens of claim 10 wherein said adjustment sleeves are carried by said lens housing for axial sliding and rotational movement relative thereto, said locking means including axially presented locking surfaces formed on said adjustment sleeves and a housing portion rotatable with said focus ring and spring means for urging said adjustment sleeves axially for normal locking engagement of said locking surfaces, said adjustment sleeves being axially retractable individually against said spring means to disengage said locking surfaces.

12. The photographic lens of claim 11 wherein said adjustment sleeves are axially spaced from each other, said spring means comprising a compression spring reacting between said adjustment sleeves for urging said adjustment sleeves axially away from each other.

13. The photographic lens of claim 11 wherein said locking surfaces comprise a pair of axially presented sets of locking teeth arranged to extend at least partially about the circumference of said rotatable housing portion and a pair of axially extending protrusions formed respectively on said adjustment sleeves for respective engagement with said sets of teeth.

14. The photographic lens of claim 11 wherein said rotatable housing portion is carried about said fixed housing portion, said control pins on said adjustment sleeves extending generally inwardly through clearance slots formed in said rotatable housing portion and into said cam groove, said clearance slots having sufficient axial width to permit sufficient axial movement of said adjustment sleeves for engaging and disengaging said locking surfaces.

15. A photographic lens with variable range focus setting adjustment, comprising:
a generally cylindrical lens housing supporting at least one focusing lens element for axial displacement therein to adjust the focus setting of the photographic lens, said lens housing including a housing portion fixed against rotation and having a pair of cam grooves formed therein each to extend at least partially about the circumference of said lens housing;
a focus ring rotatable about said lens housing and operably coupled to displace said focusing lens element through a range of focus settings in response to focus ring rotation; and
a range stop assembly for adjustably selecting the permitted range of focus ring rotation to correspondingly select the permitted range of focus ring adjustment, said range stop assembly including a pair of adjustment sleeves carried by said lens housing for axial sliding and rotational movement relative thereto and supporting respectively a pair of control pins extending respectively into said cam grooves, locking surfaces formed on a housing portion rotatable with said focus ring and said adjustment sleeves, and spring means for urging said adjustment sleeves axially for normal engagement of said locking surfaces to prevent rotation of said adjustment sleeves relative to said focus ring, said adjustment sleeves being axially retractable individually against said spring means to disengage said locking surfaces to permit selective individual rotation of said adjustment sleeves relative to said focus ring to selectively alter the respective positions of said control pins relative to said cam grooves to correspondingly alter the positions of the end limits.

16. The photographic lens of claim 15 wherein said adjustment sleeves are axially spaced from each other, said spring means comprising a compression spring reacting between said adjustment sleeves for urging said adjustment sleeves axially away from each other.

17. The photographic lens of claim 15 wherein said locking surfaces comprise a pair of axially presented sets of locking teeth arranged to extend at least partially about the circumference of said rotatable housing portion and a pair of axially extending protrusions formed respectively on said adjustment sleeves for respective engagement with said sets of teeth.

18. The photographic lens of claim 15 wherein said rotatable housing portion is carried about said fixed housing portion, said control pins on said adjustment sleeves extending generally inwardly through clearance slots formed in said rotatable housing portion and into said cam groove, said clearance slots having sufficient width to permit sufficient axial movement of said adjustment sleeves for engaging and disengaging said locking surfaces.

19. A photographic lens with variable range focus setting adjustment, comprising:
a generally cylindrical lens housing supporting at least one focusing lens element for axial displacement therein to adjust the focus setting of the photographic lens, said lens housing further including a first housing portion fixed against rotation and a second housing portion carried about and rotatable with respect to said first housing portion, said first housing portion having a pair of cam grooves formed therein each to extend partially about the circumference thereof;
a focus ring rotatable about said lens housing and operably coupled to displace said at least one focusing lens element in response to focus ring rotation;
means for coupling said second housing portion for rotation with said focus ring;
a pair of adjustment sleeves carried about said second housing portion for axial sliding movement and rotational movement relative thereto;
first locking surfaces on said second housing portion and one of said adjustment sleeves for preventing relative rotation therebetween when said first locking surfaces are engaged;
second locking surfaces on said second housing portion and the other of said adjustment sleeves for preventing relative rotation therebetween when said second locking surfaces are engaged:
a pair of control pins respectively carried by said adjustment sleeves and extending through clearance slots formed in said second housing portion respectively into said cam grooves for engagement with the ends of said cam grooves upon focus ring rotation to define end limits of focus ring rotation; and spring means for urging said first and second locking surfaces into normal locking engagement to prevent rotation of said adjustment sleeves relative to said focus ring, said adjustment sleeves being axially retractable individually against said spring means to disengage said first and second locking surfaces to permit selective individual rotation of said adjustment sleeves relative to said focus ring to selectively alter the respective positions of said control pins relative to said cam groove to correspondingly alter the positions of the end limits;

said clearance slots in said second housing portion having sufficient axial width to permit sufficient axial movement of said adjustment sleeves for engaging and disengaging said first and second locking surfaces.

20. The photographic lens as set forth in claim 19 wherein said adjustment sleeves are axially spaced from each other, said spring means comprising a compression spring reacting between said adjustment sleeves for urging said adjustment sleeves axially away from each other.

21. The photographic lens as set forth in claim 19 wherein said first locking surfaces comprise a first set of axially presented locking teeth arranged to extend at least partially about the circumference of said second housing portion and an axially presented first protrusion on one of said adjustment sleeves, and wherein said second locking surfaces comprise a second set of axially presented locking teeth to extend at least partially about the circumference of said second housing portion and axially presented second protrusion on the other of said adjustment sleeves.

22. The photographic lens of claim 21 wherein said first and second sets of locking teeth are formed generally in axial facing relation at opposite ends of said second housing portion, said adjustment sleeves being positioned axially between said first and second sets of locking teeth.

23. The photographic lens of claim 19 wherein said pair of adjustment sleeves are at least partially exposed at one end of said focus ring to permit grasping of said adjustment sleeves.

24. The photographic lens of claim 19 wherein said lens housing further supports at least one zoom lens element for axial displacement to adjust image magnification, said focus ring being axially slidable about said lens housing and operably coupled to displace said at least one zoom lens element through a range of image magnification settings in response to axial movement of said focus ring.

25. The photographic lens of claim 24 wherein said second housing portion supports said focusing lens element, said first and second housing portions including interengageable helicoid tracks.

26. A photographic lens with variable range focus setting adjustment, comprising:

a generally cylindrical lens housing supporting at least one focusing lens element for axial displacement therein to adjust the focus setting of the photographic lens, said lens housing including a housing portion fixed against rotation and having a cam groove formed therein to extend at least partially about the circumference thereof;

a focus ring rotatable about said lens housing and operably coupled to displace said focusing lens element through a range of focus settings in response to focus ring rotation; and a range stop assembly including a pair of control pins normally rotatable with said focus ring and extending into said cam groove for engagement with the ends of said cam groove to limit focus ring rotation to a prescribed range of movement to correspondingly limit the permitted range of focus setting adjustment, said range stop assembly including means for selectively and individually altering the positions of said control pins relative to said cam groove to correspondingly alter the permitted range of focus setting adjustment between two selected focus settings.

* * * * *